(12) United States Patent
Yui et al.

(10) Patent No.: US 7,336,317 B2
(45) Date of Patent: Feb. 26, 2008

(54) FRAME RATE CONVERSION DEVICE, OVERTAKING PREDICTION METHOD FOR USE IN THE SAME, DISPLAY CONTROL DEVICE AND VIDEO RECEIVING DISPLAY DEVICE

(75) Inventors: Hideaki Yui, Kanagawa (JP); Eiichi Matsuzaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 565 days.

(21) Appl. No.: 10/944,179

(22) Filed: Sep. 20, 2004

(65) Prior Publication Data
US 2005/0105001 A1 May 19, 2005

(30) Foreign Application Priority Data
Sep. 25, 2003 (JP) ............................ 2003-333870
Sep. 13, 2004 (JP) ............................ 2004-265364

(51) Int. Cl.
*H04N 11/20* (2006.01)
*H04N 9/64* (2006.01)
(52) U.S. Cl. ...................................... 348/459; 348/718
(58) Field of Classification Search .............. 348/441, 348/459, 445, 446, 448, 443, 714–718
See application file for complete search history.

(56) References Cited

U.S. PATENT DOCUMENTS

| | | | |
|---|---|---|---|
| 5,402,247 A | 3/1995 | Kuroda | 358/335 |
| 5,446,496 A | 8/1995 | Foster et al. | 348/441 |
| 5,598,218 A * | 1/1997 | Inoue | 348/443 |
| 5,880,702 A | 3/1999 | Morimoto et al. | 345/1 |
| 5,926,159 A | 7/1999 | Matsuzaki et al. | 345/97 |
| 6,054,980 A | 4/2000 | Eglit | 345/204 |
| 6,141,055 A | 10/2000 | Li | 348/446 |
| 6,473,088 B1 | 10/2002 | Matsumoto et al. | 345/530 |

(Continued)

FOREIGN PATENT DOCUMENTS

JP  5-191782  7/1993

(Continued)

OTHER PUBLICATIONS

Feb. 10, 2006 European Search Report in European Application No. 04 02 2831.

(Continued)

*Primary Examiner*—M. Lee
(74) *Attorney, Agent, or Firm*—Fitzpatrick, Cella, Harper & Scinto

(57) ABSTRACT

An overtaking prediction method of, when input and output of data to and from a common memory are being performed with an input frame frequency and an output frame frequency made different from each other, predicting a frame in which overtaking occurs between the input and the output of the data to and from the memory. The overtaking prediction method includes a step of predicting the frame in which the overtaking occurs between the input and the output of the data, on the basis of a first parameter corresponding to a difference amount between a progress speed of a write address and a progress speed of a read address and a second parameter corresponding to a difference between a write address and a read address at an overtaking prediction point and to an offset address difference amount between an input offset address and an output offset address.

16 Claims, 13 Drawing Sheets

U.S. PATENT DOCUMENTS

| | | | |
|---|---|---|---|
| 6,493,008 B1 | 12/2002 | Yui | 345/840 |
| 6,538,675 B2 | 3/2003 | Aratani et al. | 345/856 |
| 6,559,896 B1 | 5/2003 | Zwartenkot et al. | 348/714 |
| 2002/0167503 A1 | 11/2002 | Tsunoda et al. | |
| 2004/0113929 A1 | 6/2004 | Matsuzaki | |
| 2004/0158874 A1 | 8/2004 | Ono et al. | |
| 2004/0246375 A1 | 12/2004 | Matsuzaki et al. | |

FOREIGN PATENT DOCUMENTS

| | | |
|---|---|---|
| JP | 07-219495 | 8/1995 |
| JP | 8-149371 | 6/1996 |
| JP | 11-055591 | 2/1999 |
| JP | 2001-013934 | 1/2001 |
| JP | 2001-13934 | 1/2001 |
| JP | 2001-083928 | 3/2001 |
| JP | 2001-83928 | 3/2001 |
| JP | 2001083928 A * | 3/2001 |
| WO | WO 96/07175 A1 | 3/1996 |

OTHER PUBLICATIONS

Patent Abstracts of Japan, vol. 2000, No. 16, May 8, 2001 (JP-A 2001-013934, Jan. 19, 2001).

Patent Abstracts of Japan, vol. 2000, No. 20, Jul. 10, 2001 (JP-A 2001-083928, Mar. 30, 2001).

* cited by examiner

Fig.8A  (A) DUAL-PICTURE DISPLAY
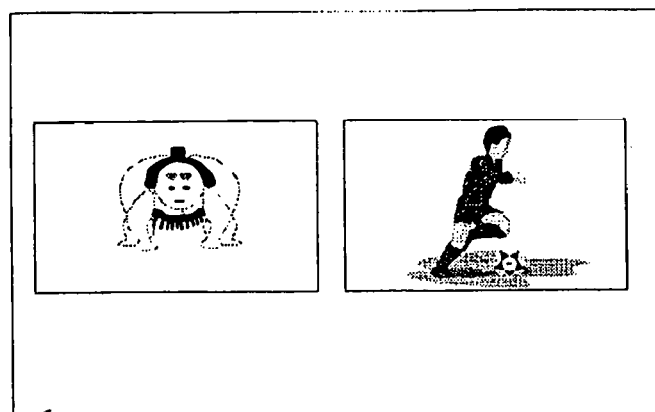
MULTI-PICTURE BACKGROUND DATA
(B) DUAL PICTURE-IN-PICTURE DISPLAY
Fig.8B
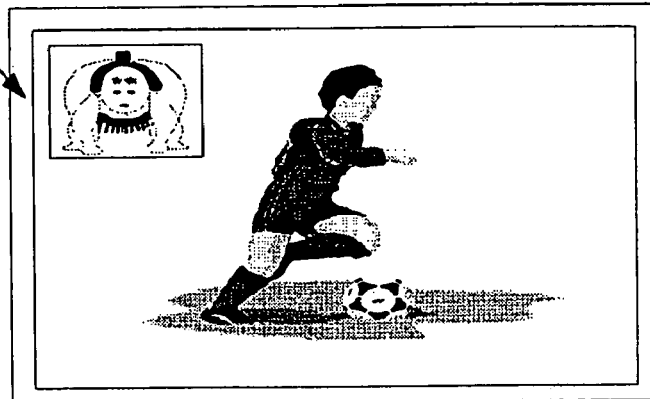

FRAME RATE CONVERSION DEVICE, OVERTAKING PREDICTION METHOD FOR USE IN THE SAME, DISPLAY CONTROL DEVICE AND VIDEO RECEIVING DISPLAY DEVICE

This application claims priority from Japanese Patent Application No. 2003-333870 filed Sep. 25, 2003, and Japanese Patent Application No. 2004-265364 filed Sep. 13, 2004, which are hereby incorporated by reference herein.

BACKGROUND OF THE INVENTION

1. Field of the Invention

The present invention relates to a frame rate conversion device using overtaking prediction, and an overtaking prediction method for use in the same. A video receiving display apparatus such as TV system is provided with the frame rate conversion device.

2. Description of the Related Art

In the broadcasting industry, the transition from analog terrestrial broadcasting to BS/CS/terrestrial digital broadcasting, so-called digitization of broadcasting, is currently proceeding. At the same time, the role of television is also greatly changing from "TV set placed in living room" toward "information window of home". This trend of digitization increases the number of programs to be sent to each home (an increase in the number of channels), and the amount of information of video is also increasing from SD (Standard Definition) toward HD (High Definition).

The roles of display devices are also changing under this trend. Specifically, display devices having larger screen sizes and higher definitions are being developed so that video images with realistic presence can be reproduced in home living rooms. A typical example is a PDP (plasma display) of over 50 inches.

Under these trends toward digitization of broadcasting and larger screen sizes and higher definitions of display devices, as a method of using a television set as an "information window of home", there is a form of display called multi-picture display, which simultaneously displays images from various media on one display. In general, a method of temporarily storing input sources having different frame rates in a frame memory, reading images from the memory in synchronism with the display rate of a display, and synthesizing and displaying the images on the basis of a picture layout is adopted to realize a multi-picture display function.

In this case, during the frame rate conversion of synchronizing different frame rates of the respective input sources having different formats with the display rate of the display, it is indispensable to prevent a disturbance of an image generally called "overtaking".

The principle of occurrence of this overtaking and a general preventive method will be described below.

FIG. 11A is an explanatory view of overtaking in the case of input frame rate Fiv[Hz]>output frame rate Fov[Hz]. In the case where an input video image in which an automobile is running from the left to the right is updated in units of frame like (1)→(2)→(3)→(4)→(5) (represented by circled numbers in FIG. 11A, respectively), this video image is written to a frame memory in synchronism with the input frame rate Fiv[Hz] during periods of W0→W1→W2→W3→W4. The transition of a write address during this time can be represented as a repeated waveform such as the sawtooth waveform shown by solid lines in FIG. 11A.

In the meantime, reading from the frame memory is performed in synchronism with the output frame rate Fov [Hz] during periods of R0→R1→R2. The transition of a read address during this time can be represented as a repeated waveform such as the sawtooth waveform shown by dashed lines in FIG. 11A.

In this case, overtaking occurs at a point (marked with "OVERTAKING POINT" in FIG. 11A) where the write address and the read address cross each other. Accordingly, in an output video image, outputting is overtaken by the updating of input during the reading of one frame, and an image made of different upper and low frames (an old frame (2) on the upper side and a new frame (3) on the lower side) is outputted. It is possible to cope with this phenomenon by bringing the writing of the input video image to the frame memory to a stop during the period (W2) shown in FIG. 11B in which overtaking occurs, but the frame (3) is omitted from the output video image and a frame omission occurs.

FIG. 12A is an explanatory view of overtaking in the case of input frame rate Fiv[Hz]<output frame rate Fov[Hz]. In this case as well, overtaking occurs on the basis of a principle similar to that mentioned in connection with FIG. 11A. Accordingly, in an output video image, the updating of input is overtaken by outputting during the reading of one frame, and an image made of different upper and low frames (a new frame (3) on the upper side and an old frame (2) on the lower side) is outputted. It is possible to cope with this phenomenon by bringing the writing of the input video image to the frame memory to a stop during the period (W2) shown in FIG. 12B in which overtaking occurs, but the frame (3) is omitted from the output video image, and in this case, multiple frames are displayed in a superimposed manner (multiple display).

The frame omission and the multiple display which occur due to this overtaking preventing method cannot be avoided when frame rate conversion is performed. However, the case in which a video image contains images split within a frame due to overtaking causes an unnatural visual appearance, and in this case and in general, an overtaking measure can be taken to reduce the unnatural visual appearance.

In either case, by predicting overtaking in advance and bringing writing to the memory to a stop, it is possible to realize an overtaking measure in a single buffer (a memory capacity for one picture). In this overtaking measure using a single buffer, it is necessary to perform overtaking prediction, and a method for overtaking prediction is disclosed in JP-A-2001-13934.

In addition to the above-mentioned overtaking measure using a single buffer, a double-buffer overtaking preventing method is known. This method is a control method which prepares not a memory area for one picture but memory areas for two pictures and writes data to the memory areas while alternately switching the memory areas therebetween, and reads data from a frame different from a written frame so that overtaking does not occur.

If the frame rate conversion of the above-mentioned related art is to be applied to multi-picture display, the following two matters must be solved:

(1) reduction in frame memory capacity and simplification of overtaking measure control circuit; and (2) handling of picture layout change during multi-picture display.

First, (1) will be described below.

Overtaking measures for multi-picture display must have a plurality of independent frame rate conversion processings because of the relationship between individual inputs and a display output.

Accordingly, if the related-art double-buffer or multi-buffer method is selected as a frame rate conversion method, a frame memory capacity of twice the number of multi-picture inputs becomes necessary. (For example, if a multi-picture display made of four pictures is to be handled, a memory capacity of eight frames becomes necessary.) Accordingly, the above-mentioned single-buffer method is more advantageous in that memory costs can be reduced. In this case, since overtaking measure control circuits are necessary by the number of pictures, it is required that the control method can be realized by a simple circuit.

Then, (2) will be described below.

In general, in the case of many single-picture displays, the timing formats of input and output are preset on a system basis, and is rarely dynamically changed. Accordingly, since frame rate conversion can be handled on predetermined fixed conditions, various related art methods including the constructions described in JP-A-2001-13934 and JP-A-2001-83928 are devised. However, when a picture from a certain image source is to be displayed in an offset state at an arbitrary position within the screen of a display device, like multi-picture display and reduced screen display, the picture layout is in many cases dynamically changed as a display mode for a user. Accordingly, since not only the timing formats of input and output differ from each other but also the frame rates of a plurality of inputs and a display output differ from each other, it is difficult to perform frame rate conversion under fixed conditions like single-picture display.

In other words, there is not a related art which takes into account the offset difference between an effective area and an input video effective area, so that accurate prediction of overtaking has heretofore been difficult.

SUMMARY OF THE INVENTION

The invention provides an overtaking prediction method which is enhanced in accuracy (free of erroneous detection due to offset difference) by taking offset difference into account.

The invention also provides a frame rate conversion device capable of preventing disturbances of display caused by overtaking, by means of a simple control circuit without increasing a memory capacity.

A first aspect of the invention provides a frame rate conversion device including a memory controller which performs input and output of data to and from a common memory while making an input frame frequency and an output frame frequency different from each other, an overtaking prediction unit which predicts a frame in which overtaking occurs between the input and the output of the data to and from the memory, and a memory writing controller which brings writing to the memory to a stop when the overtaking prediction unit predicts that the overtaking occurs, the overtaking prediction unit having a function of predicting the frame in which the overtaking occurs between the input and the output of the data, on the basis of at least an offset address difference amount.

More specifically, when an input frame frequency, an output frame frequency and the amount of all memory addresses for one frame are respectively defined as Fiv, Fov and N, as a first parameter a frame in which overtaking occurs between the input and output of data is predicted by taking into account the difference amount (K) between the progress speed of a write address for the memory and the progress speed of a read address for the memory and a read address (M) at an overtaking prediction point as well as the difference (Woffset−Roffset) between a write-side offset address and a read-side offset address, that is to say, by correcting M.

A second aspect of the invention provides a frame rate conversion device including a memory controller having at least two inputs and operative to perform input and output of data to and from a common memory while making an input frame frequency and an output frame frequency different from each other with respect to each of the inputs, an overtaking prediction unit provided for each of the inputs to predict a frame in which overtaking occurs between the input and the output of the data to and from the memory, and a memory writing controller provided for each of the inputs to bring writing to the memory to a stop when the overtaking prediction unit predicts that the overtaking occurs, the overtaking prediction unit having a function of predicting the frame in which the overtaking occurs between the input and the output of the data, on the basis of at least an offset address difference amount.

More specifically, the difference (Woffset−Roffset) between a write-side offset address and a read-side offset address for each memory plane based on a multi-picture synthesis layout is updated each time picture layout is modified, whereby prediction of overtaking between each input and the corresponding output is performed by a method similar to overtaking prediction for single-picture display. Accordingly, the frame rate conversion device can also cope with multi-picture display whose picture layout dynamically varies.

A third aspect of the invention provides a frame rate conversion device according to the first or second aspect, in which when a progress speed of a write address for the memory is faster than a progress speed of a read address for the memory, a first parameter is derived from a result obtained by dividing by the input frame frequency a difference amount between a result obtained by multiplying one frame of address amount in the input by the input frame frequency and a result obtained by multiplying one frame of address amount in the output by the output frame frequency.

More specifically, in the case of Fiv>Fov, a read address is corrected with M'=M+(Woffset−Roffset), the corrected read address M' and a threshold K expressed by N×(Fiv−Fov)/Fiv are compared, and if it is determined that M'<K, it is predicted that overtaking occurs in the current frame.

A fourth aspect of the invention provides a frame rate conversion device according to the first or second aspect, in which when a progress speed of a write address for the memory is slower than a progress speed of a read address for the memory, a first parameter is derived from a result obtained by dividing by the input frame frequency a difference amount between twice as large as a result obtained by multiplying one frame of address amount in the input by the input frame frequency and a result obtained by multiplying one frame of address amount in the output by the output frame frequency.

More specifically, in the case of comparing Fiv<Fov, M' and a threshold K expressed by N×(2Fiv−Fov)/Fiv, if it is determined that M'>K, it is predicted that overtaking occurs in the current frame.

A fifth aspect of the invention provides a frame rate conversion device according to the first or second aspect, in which a second parameter is derived by performing correction to add the offset address difference amount to a read address during the writing to the memory.

More specifically, the read address is corrected with M'=M+(Woffset−Roffset).

A sixth aspect of the invention provides a frame rate conversion device according to the first or second aspect, in which the overtaking prediction unit has a comparison unit which compares a first parameter and a second parameter, the comparison unit having a function of predicting a frame in which overtaking occurs, by effecting switching between comparison conditions according to a difference between a progress speed of a write address for the memory and a progress speed of a read address for the memory.

More specifically, to cope with a system in which the difference between the progress speed of a write address for the memory and the progress speed of a read address for the memory cannot be determined in advance because its input and output frame rates are variable, the comparison conditions are switched therebetween on the basis of the difference between the progress speed of the write address and the progress speed of the read address so that it is also possible to cope with a case in which the input and output frame rates are variable.

A seventh aspect of the invention provides a frame rate conversion device according to the sixth aspect, in which the overtaking prediction unit has a function of predicting that overtaking occurs, when the progress speed of the write address for the memory is faster than the progress speed of the read address for the memory, while the comparison unit has a function of predicting that overtaking occurs, when the second parameter is smaller than the first parameter.

An eighth aspect of the invention provides a frame rate conversion device according to the sixth aspect, in which the overtaking prediction unit has a function of predicting that overtaking occurs, when the progress speed of the write address for the memory is slower than the progress speed of the read address for the memory, while the comparison unit has a function of predicting that overtaking occurs, when the second parameter is larger than the first parameter.

A ninth aspect of the invention provides an overtaking prediction method of, when input and output of data to and from a common memory are being performed with an input frame frequency and an output frame frequency made different from each other, predicting a frame in which overtaking occurs between the input and the output of the data to and from the memory. The overtaking prediction method includes a step of predicting the frame in which the overtaking occurs between the input and the output of the data, on the basis of at least an offset address difference amount.

More specifically, an overtaking prediction method of, when input and output of data to and from a common memory are being performed with an input frame frequency and an output frame frequency made different from each other, predicting a frame in which overtaking occurs between the input and the output of the data to and from the memory preferably includes a step of predicting the frame in which the overtaking occurs between the input and the output of the data, on the basis of a first parameter corresponding to a difference amount between a progress speed of a write address and a progress speed of a read address and a second parameter corresponding to a difference between a write address and a read address at an overtaking prediction point and to an offset address difference amount.

A tenth aspect of the invention provides a frame rate conversion device including a memory controller which performs input and output of data to and from a common memory while making an input frame frequency and an output frame frequency different from each other, and an overtaking prediction unit which predicts a frame in which overtaking occurs between the input and the output of the data to and from the memory, the overtaking prediction unit being constructed to execute an overtaking prediction method according to claim 9.

According to the invention, it is possible to provide an overtaking prediction method which is enhanced in accuracy (free of erroneous detection due to offset difference) by taking offset difference into account.

By using this overtaking prediction method, it is possible to prevent disturbances of display caused by overtaking, by means of a simple control circuit without increasing a memory capacity, in frame rate conversion for single-picture display and multi-picture display.

In multi-picture display in particular, it is possible to realize accurate overtaking prediction even in the case of dynamic variations of picture layout, and it is possible to flexibly cope with variations in system conditions such as input and output timing formats and the frame rates of a plurality inputs and a display output. Accordingly, the present inventive method can be applied to all systems that perform frame rate conversion.

BRIEF DESCRIPTION OF THE DRAWINGS

The invention will become more readily appreciated and understood from the following detailed description of preferred embodiments of the invention when taken in conjunction with the accompanying drawings, in which:

FIGS. 8A and 8B are schematic views of multi-picture displays;

DETAILED DESCRIPTION OF THE PREFERRED EMBODIMENTS

Preferred embodiments of the invention will be described below in detail with reference to the accompanying drawings.

First Embodiment

Figure 1:
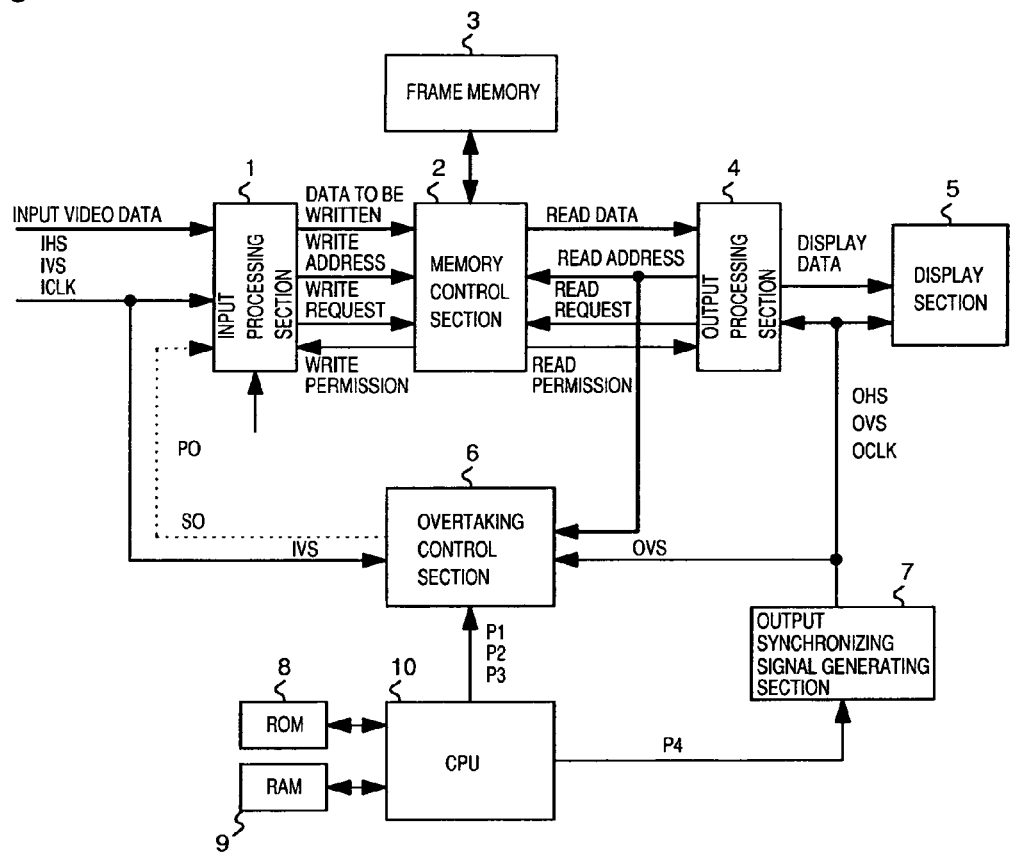
FIG. 1 is a block diagram aiding in explaining an overtaking prediction control method according to a first embodiment of the invention.

FIG. 1 shows a block diagram aiding in explaining an overtaking prediction control method according to the invention.

<Description of Individual Blocks>

The block diagram of FIG. 1 shows a frame synchronization circuit for single-picture display (one input, one output), a display control device provided with this frame synchronization circuit, and a display device provided with this display control device and a display section. Individual blocks will be described below.

An input processing section 1 receives input video data together with an input horizontal synchronizing signal (IHS), an input vertical synchronizing signal (IVS), and an input clock signal (ICLK), and performs image processing and scaling processing (resolution conversion) on the input video data, and transfers the processed video data to a memory control section 2. The scaling processing is capable of enlargement or reduction to a desired magnification on the basis of a parameter indicative of a scaling magnification (P0), which parameter is received from a CPU 10. The transfer of the data from the input processing section 1 to the memory control section 2 is executed in such a way that the memory control section 2 gives write permission to the input processing section 1 when the input processing section 1 makes a write request to the memory control section 2 and the memory control section 2 determines that a frame memory 3 is writable. When receiving the write permission, the input processing section 1 transfers the data to be written to the memory control section 2 together with an internally generated write address for the frame memory 3. The input processing section 1 is also constructed to be capable of controlling writing of a frame. Specifically, when the input processing section 1 receives a write inhibit signal (SO) from an overtaking control section 6 and is inhibited from writing, the input processing section 1 brings writing to the frame memory 3 to a stop in units of one frame period, by stopping issuing a write request to the memory control section 2.

The memory control section 2 performs transfer control for the frame memory 3 while arbitrating between the write request from the input processing section 1 and a read request from an output processing section 4. The memory control section 2 corresponds to memory control means in the invention.

In the example shown in FIG. 1, the frame memory 3 serves as a single buffer having the role of storing one frame of video data.

The output processing section 4 receives an output horizontal synchronizing signal (OHS), an output vertical synchronizing signal (OVS) and an output clock signal (OCLK) from an output synchronizing signal generating section 7. Then, the output processing section 4 reads the input video data stored in the frame memory 3 and performs driving control and format conversion corresponding to the characteristics of a display section 5, and then transfers display data to the display section 5. The transfer of the data from the memory control section 2 to the output processing section 4 is executed in such a way that the memory control section 2 gives read permission to the output processing section 4 when the output processing section 4 makes a read request to the memory control section 2 and the memory control section 2 determines that the frame memory 3 is readable. When receiving the read permission, the output processing section 4 transfers an internally generated read address to the frame memory 3 to the memory control section 2 and acquires read data. The output processing section 4 corresponds to display position control means in the invention.

The display section 5 may be any type of image display device such as CRTs, liquid crystal display devices and PDPs.

The overtaking control section 6 mainly receives the input vertical synchronizing signal (IVS), the output vertical synchronizing signal (OVS), and the read address for the frame memory 3 which is generated by the output processing section 4, and performs overtaking prediction control according to the invention. In addition, the overtaking control section 6 generates the write inhibit signal (SO) which controls writing to the frame memory 3, and transfers the write inhibit signal (SO) to the input processing section 1. Namely, the overtaking control section 6 corresponds to overtaking prediction means in the invention.

The output synchronizing signal generating section 7 receives an output timing parameter (P4) suitable for the display section 5 from the CPU 10, and generates the output horizontal synchronizing signal (OHS), the output vertical synchronizing signal (OVS) and the output clock signal (OCLK).

The CPU 10 controls the whole of the present system, and has a CPU having computing power, a RAM 9 which temporarily stores data, a ROM 8 which stores a control program, a counter which counts time, a peripheral input/output interface, and the like. The CPU 10 may be made of only logic circuits or may be a media processor capable of parallel operations. The program which performs control may be contained in the ROM 8 or may be transferred from the outside via the peripheral input/output interface.

Figure 2:
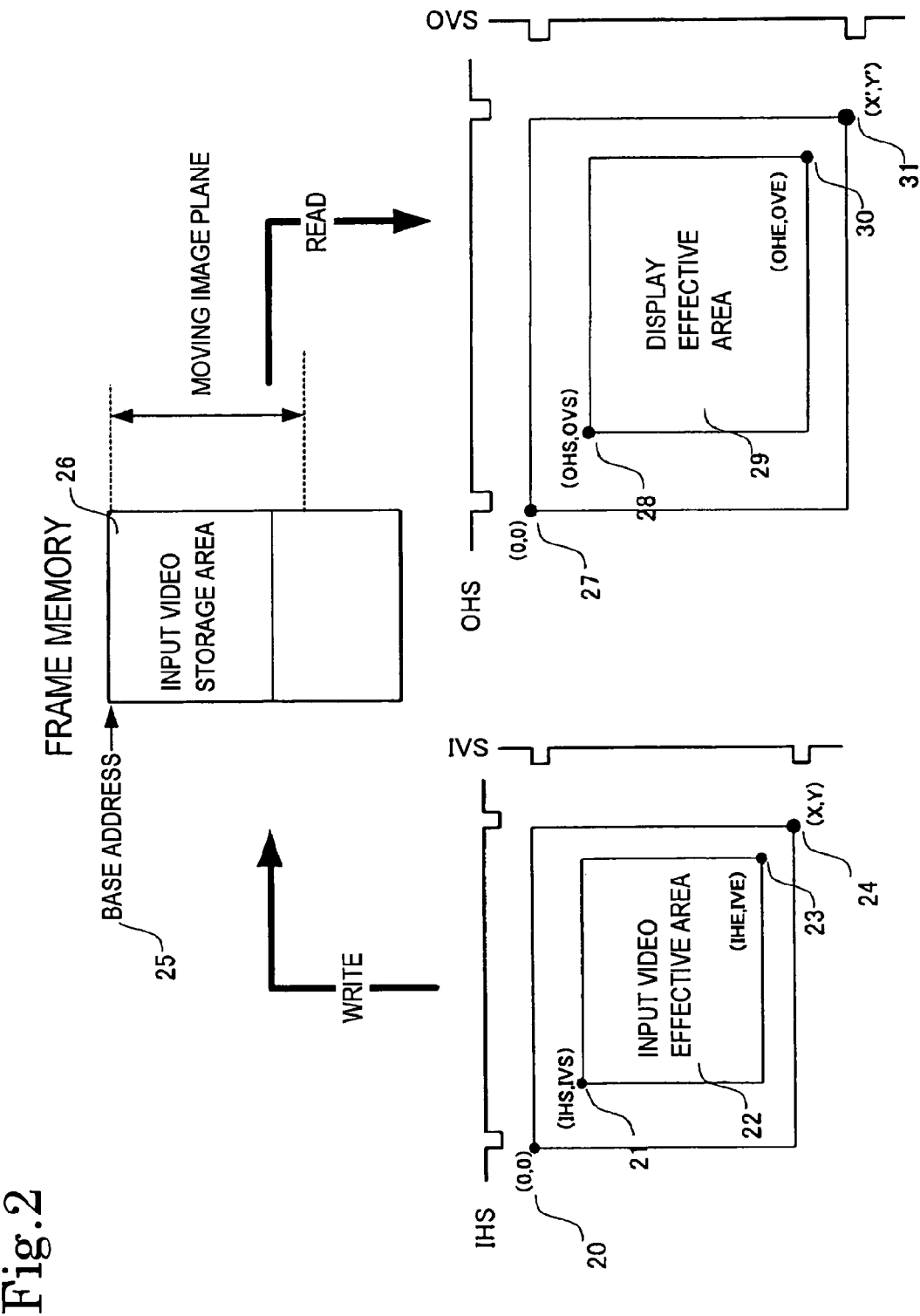
FIG. 2 is a schematic view showing the outline of writing to and reading from a frame memory in FIG. 1.

FIG. 2 shows the outline of writing to and reading from the above-mentioned frame memory 3 in the block diagram of FIG. 1. The input video data include one frame of area represented as an area extending between a reset point 20 (0, 0) which corresponds to a fall of the input horizontal synchronizing signal (IHS) and a fall of the input vertical synchronizing signal (IVS), and the next reset point 24 (X, Y) which corresponds to the next fall of the input horizontal synchronizing signal (IHS) and the next fall of the input vertical synchronizing signal (IVS), and an input video effective area 22 which exists in that area is defined as an area extending between a start point 21 (IHS, IVS) and an end point 23 (IHE, IVE). The phrase "writing to the frame memory 3" means writing the input video effective area (valid area) 22 to the frame memory 3 on the basis of a base address 25 indicative of the start point 21 (IHS, IVS), and an input video storage area 26 for one frame is allocated to one moving image plane.

The display data include one frame of area represented as an area extending between a reset point 27 (0, 0) which corresponds to a fall of the output horizontal synchronizing signal (OHS) and a fall of the output vertical synchronizing signal (OVS), and the next reset point 31 (X', Y') which corresponds to the next fall of the output horizontal synchronizing signal (OHS) and the next fall of the output vertical synchronizing signal (OVS), and a display effective area 29 which exists in that area is defined as an area extending between a start point 28 (OHS, OVS) and an end point 30 (OHE, OVE). The phrase "reading from the frame memory 3" means that the output processing section 4 reads the input video effective area 22 from the frame memory 3 on the basis of the base address 25 in synchronism with the above-mentioned display timing.

The details of an overtaking prediction method to be executed in the overtaking control section 6 shown in FIG. 1 will be described below. In the first embodiment, different overtaking prediction methods are selected according to the difference in frequency between an input frame rate; Fiv[Hz] and an output frame rate Fov[Hz]. Individual cases will be separately described below.

<Case of Fiv (Input Frame Rate)>Fov (Output Frame Rate)>

Figure 3:
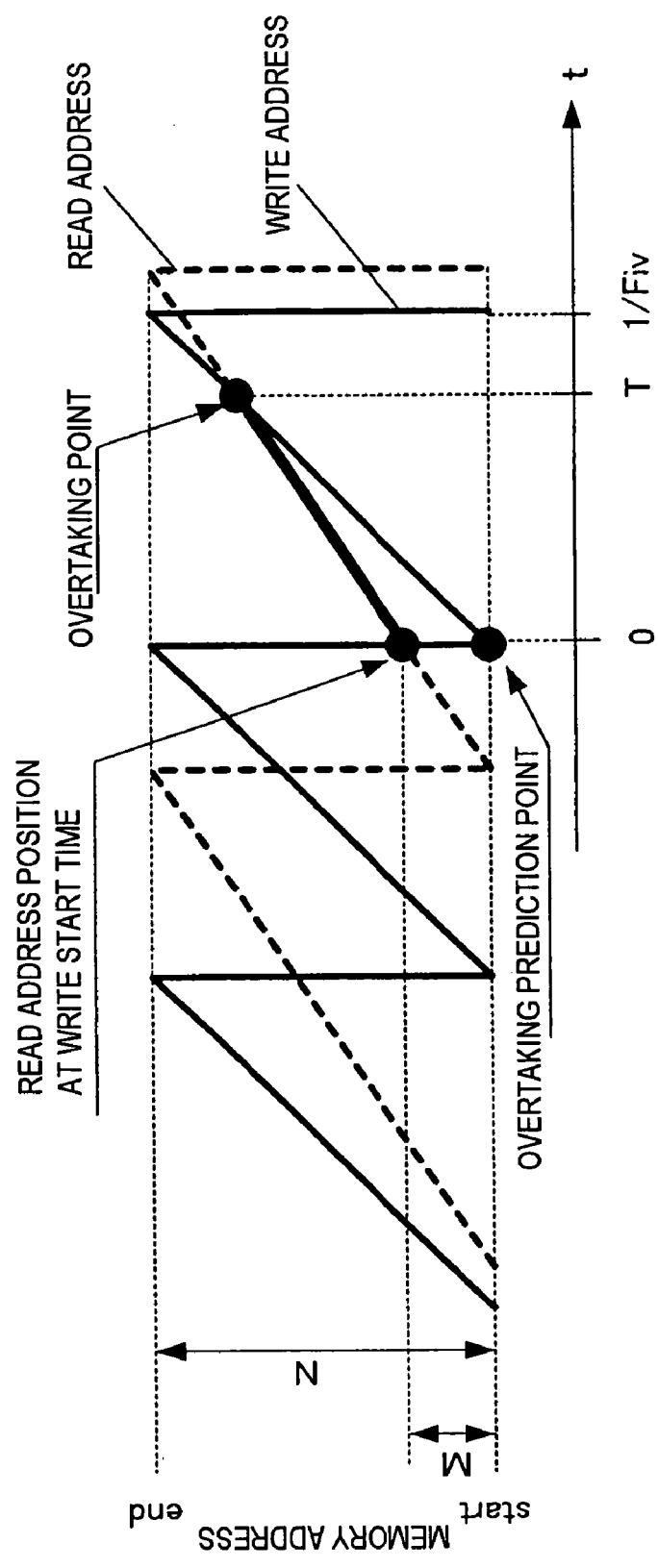
FIG. 3 is a timing chart of overtaking prediction for the case of input frame rate>output frame rate.

FIG. 3 is a timing chart aiding in explaining an overtaking prediction method for the case of Fiv (input frame rate)>Fov (output frame rate).

The case of Fiv (input frame rate)<Fov (output frame rate) will be mentioned later in the description of a second embodiment.

In FIG. 3, the horizontal axis represents time and the vertical axis represents memory address, and the variations of an input (write) address are represented by solid lines and the variations of an output (read) address are represented by dashed lines.

In FIG. 3, for ease of explanation, it is assumed that on the write side of FIG. 2, the point 20 (0, 0)=the point 21 (IHS, IVS) and the point 23 (IHE, IVE)=the point 24 (X, Y), that on the read side of FIG. 2, the point 27 (0, 0)=the point 28 (OHS, OVS) and the point 30 (OHE, OVE)=the point 31 (X', Y'), and that the point 24 (X, Y)=the point 31 (X', Y')=all memory addresses N to be accessed (actual memory access is directed to only the effective area).

Under these conditions, overtaking prediction is performed at each time when the write address is reset to a 0 (t=0). This time is defined as an overtaking prediction point. In addition, the period of time from the overtaking prediction point until overtaking occurs is defined as an overtaking prediction time (t=T). Since the purpose of overtaking prediction is to predict whether overtaking occurs between one overtaking prediction point and the next overtaking prediction point, the following expression is found:

$$0 < T < 1/Fiv \qquad \text{Expression (1)}$$

Then, expressions concerning the condition that overtaking occurs are derived.

Overtaking is a phenomenon which occurs when the relationship between the write address and the read address is reversed during one frame of reading, and the condition that overtaking occurs is:

write address (line)=read address (line)

and letting M be a read address position at a writing start time (the overtaking prediction point) (where 0<M<N), the following expression is found:

$$N \times Fiv \times T = N \times Fov \times T + M \qquad \text{Expression (2)}$$

$$T = \frac{M}{\{N \times (Fiv - Fov)\}} < \frac{1}{Fiv} \qquad \text{Expression (3)}$$

is derived, and the following expression is derived from Expression (3):

$$M < N \times \frac{Fiv - Fov}{Fiv} \text{ (where } Fiv > Fov \text{)} = K \qquad \text{Expression (4)}$$

(threshold constant)

The left-hand side of Expression (4) is a variable representative of the read address position at the overtaking prediction point, while since N, Fiv and Fov on the right-hand side of Expression (4) can be recognized as operating environment in advance by the CPU 10, the right-hand side can be expressed as a threshold constant (=K) In Expression (4), K corresponds to a first parameter in the invention, and M corresponds to a second parameter in the invention.

Accordingly, in the processing of the overtaking control section 6 of FIG. 1, the read address from the output processing section 4 and a decision threshold value (P1) are monitored at each fall of IVS, and if M<K, it is possible to predict that overtaking will occur during the current writing, so that the write inhibit signal (SO) for inhibiting writing to the frame memory 3 may be made valid.

On the other hand, unless M<K, it is possible to predict that overtaking will not occur during the current writing, so that the write inhibit signal (SO) for permitting writing to the frame memory 3 may be made invalid. As described above, the processing of the overtaking control section 6 can be realized by a very simple circuit.

<Case in which Write Offset Address and Read Offset Address Differ from each Other>

In the related art, the time at which the synchronizing signals are generated is calculated as the origin (memory address start), without taking into account that write and read offset addresses differ from each other. Accordingly, overtaking calculations are performed on the assumption that the point 21 (IHS, IVS)=the point 28 (OHS, OVS) and a write start offset address Woffset (=IHS+IVS) for the frame memory 3 at the reset time of IVS and a read start offset address Roffset (=OHS+OVS) for the frame memory 3 at the reset time of OVS coincide with each other. However, in actual systems, there are many cases where such an ideal condition is not established. However, in the case where write and read offset addresses differ from each other, if the above-mentioned overtaking prediction is performed, erroneous detection in overtaking prediction occurs as will be described later. Accordingly, if accurate overtaking prediction is to be performed, it is necessary to take into account the difference between the write offset address and the read offset address (an offset address difference amount).

Each embodiment of the present invention can be applied to such a case that Woffset (or Roffset) is coordinate origin (0, 0) 20 (or 27). In this case, an offset address difference amount is calculated.

Figure 4A:
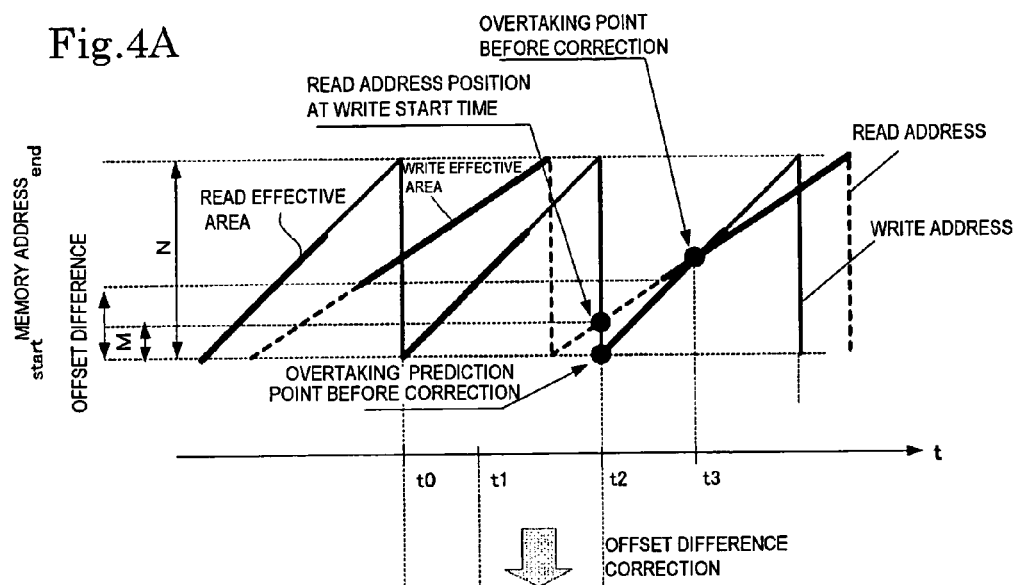
FIGS. 4A and 4B are timing charts of overtaking prediction for the case of input frame rate>output frame rate in the case of write offset address≠read offset address.
Figure 4B:
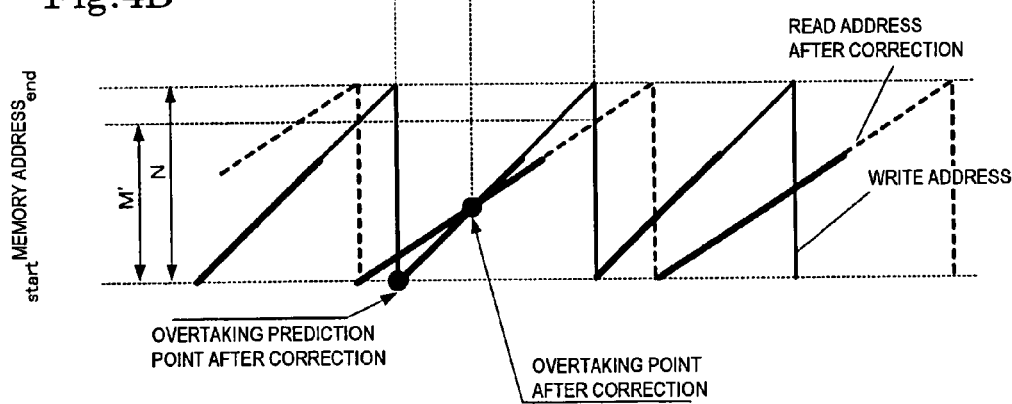

FIGS. 4A and 4B are timing charts aiding in explaining the case where the write offset address differs from the read offset address.

FIG. 4A is a timing chart showing the case where the write offset address differs from the read offset address, but this fact is not taken into account.

The portions shown by thick lines in FIGS. 4A and 4B show write-side and read-side effective areas in the case of Woffset<Roffset. Similarly to the description given in connection with FIG. 3, the prediction method shown in FIG. 4A predicts at time t2 that overtaking occurs at time t3. However, for the write side, there is an offset difference of Woffset−Roffset and it is not correct that the read address position M referred to at time t2 is adopted as a reference address for overtaking prediction. For this reason, in the first embodiment, the read address position M is corrected by the offset difference to find a corrected read address position M'. Namely, the time at which access to the frame memory 3 is actually performed is calculated as the origin (memory address start). This case is shown in the timing chart of FIG. 4B. (It is to be note that the read-side sawtooth wave shown by dashed lines in FIG. 4B represents a corrected imaginary frame rate Fov, and the timing of an actual output frame rate Fov is that shown in FIG. 4A.) An expression for correcting the read address position M with this offset difference is summarized as follows:

tmp*M*=*M*+(*W*offset−*R*offset)

However, since the read address circulates from 0 to N, the following conditions are obtained:

(1) when 0≦tempM≦N,

M'=tempM (2) when tempM<0,

*M'*=*N*+temp*M*

(3) when tempM>N,

*M'*=temp*M*−*N*  Expression (5)

To find the above-mentioned offset difference, the CPU 10 needs only to output and set P2 (input offset) and P3 (output offset) to the overtaking control section 6.

In FIG. 4B, the point resides in the fact that the conditions of FIG. 4A are converted to the conditions that the effective areas start addresses of the write side and the read side are the same and the offset difference is 0. Accordingly, since Expression (4) can be used, at time t0, it is possible to make an accurate overtaking prediction that overtaking occurs at time t1, whereby it is possible to prevent erroneous detection in overtaking prediction.

Namely, if the read address position M is corrected into M' by the offset difference from Expression (5) and M' is substituted into Expression (4), a similar expression can be obtained:

$$M' < N \times \frac{Fiv - Fov}{Fiv} \text{ (where } Fiv > Fov) = K$$
(threshold constant)

Accordingly, the processing of the overtaking control section 6 can be realized by a very simple circuit.

Second Embodiment

In the description of the first embodiment, reference has been made to the overtaking prediction method for the case of Fiv (input frame rate)>Fov (output frame rate). In the second embodiment, reference will be made to the opposite case.

<Case of Fiv (Input Frame Rate)<Fov (Output Frame Rate)>

Figure 5:
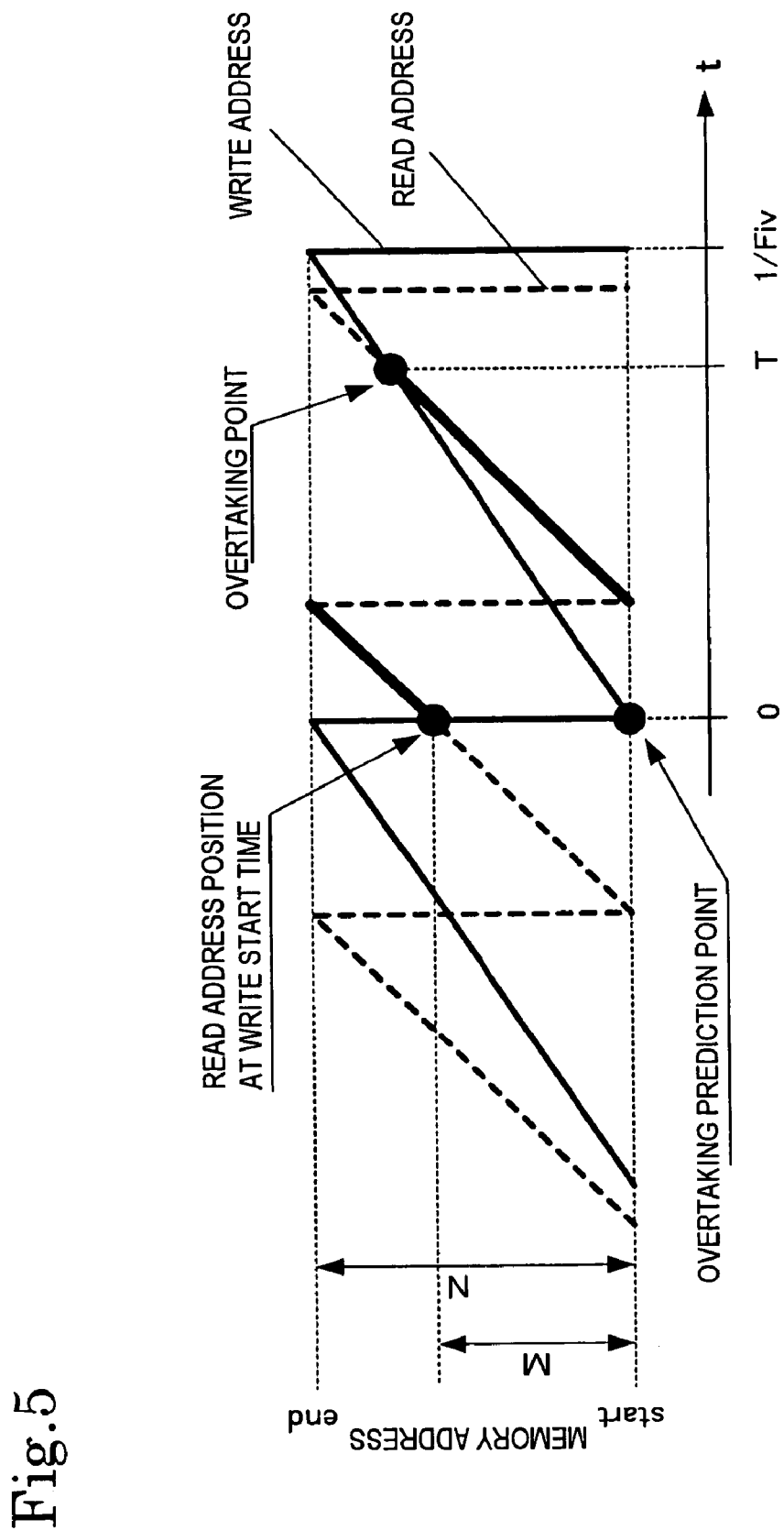
FIG. 5 is a timing chart of overtaking prediction for the case of input frame rate<output frame rate.

FIG. 5 is a timing chart aiding in explaining an overtaking prediction method for the case of Fiv (input frame rate)<Fov (output frame rate).

In FIG. 5, the horizontal axis represents time and the vertical axis represents memory address, and the variations of an input (write) address are represented by solid lines and the variations of an output (read) address are represented by dashed lines.

In FIG. 5, for ease of explanation, it is assumed that on the write side of FIG. 2, the point 20 (0, 0)=the point 21 (IHS, IVS) and the point 23 (IHE, IVE)=the point 24 (X, Y), that on the read side of FIG. 2, the point 27 (0, 0)=the point 28 (OHS, OVS) and the point 30 (OHE, OVE)=the point 31 (X', Y'), and that the point 24 (X, Y)=the point 31 (X', Y')=all memory addresses N to be accessed (actual memory access is directed to only the effective area).

Under these conditions, overtaking prediction is performed at each time when the write address is reset to a 0 (t=0). This time is defined as an overtaking prediction point. In addition, the period of time from the overtaking prediction point until overtaking occurs is defined as an overtaking prediction time (t=T). Since the purpose of overtaking prediction is to predict whether overtaking occurs between one overtaking prediction point and the next overtaking prediction point, the following expression is found:

0<*T*<1/*Fiv*  Expression (1')

Then, expressions concerning the condition that overtaking occurs are derived.

Overtaking is a phenomenon which occurs when the relationship between the write address and the read address is reversed during one frame of reading, and the condition that overtaking occurs is:

write address (line)=read address (line)

and letting M be a read address position at a writing start time (the overtaking prediction point) (where 0<M<N), the following expression is found

*N*×*Fiv*×*T*=*N*×*Fov*×*T*−(*N*−*M*)  Expression (2')

$$T = \frac{N - M}{\{N \times (Fov - Fiv)\}} < \frac{1}{Fiv}$$
Expression (3')

is derived, and the following expression is derived from Expression (3');

$$M > N \times \frac{2Fiv - Fov}{Fiv} \text{ (where } Fiv > Fov/2) = K'$$
Expression (4')
(threshold constant)

The left-hand side of Expression (4') is a variable representative of the read address position at the overtaking prediction point, while since N, Fiv and Fov on the right-hand side of Expression (4') can be recognized as operating environment in advance by the CPU 10, the right-hand side can be expressed as the threshold constant (=K'). In Expression (4'), K' corresponds to the first parameter.

Accordingly, in the processing of the overtaking control section 6 of FIG. 1, the read address from the output processing section 4 and the decision threshold value (P1) are monitored at each fall of IVS, and if M>K', it is possible to predict that overtaking will occur during the current writing, so that the write inhibit signal (SO) for inhibiting writing to the frame memory 3 may be made valid.

On the other hand, unless M>K', it is possible to predict that overtaking will not occur during the current writing, so that the write inhibit signal (SO) for permitting writing to the frame memory 3 may be made invalid. As described above, the processing of the overtaking control section 6 can be realized by a very simple circuit.

<Case in which Write Offset Address and Read Offset Address Differ from Each Other>

In the related art, the time at which the synchronizing signals are generated is calculated as the origin (memory address start), without taking into account that write and read offset addresses differ from each other. Accordingly, overtaking calculations are performed on the assumption that the point 21 (IHS, IVS)=the point 28 (OHS, OVS) and the write start offset address Woffset (=IHS+IVS) for the frame memory 3 at the reset time of IVS and the read start offset address Roffset (=OHS+OVS) for the frame memory 3 at the reset time of OVS coincide with each other. However, in actual systems, there are many cases where such an ideal condition is not established. However, in the case where write and read offset addresses differ from each other, if the above-mentioned overtaking prediction is performed, erroneous detection in overtaking prediction occurs as will be described later. Accordingly, if accurate overtaking prediction is to be performed, it is necessary to take into account the difference between the write offset address and the read offset address (an offset address difference amount).

Figure 6A:
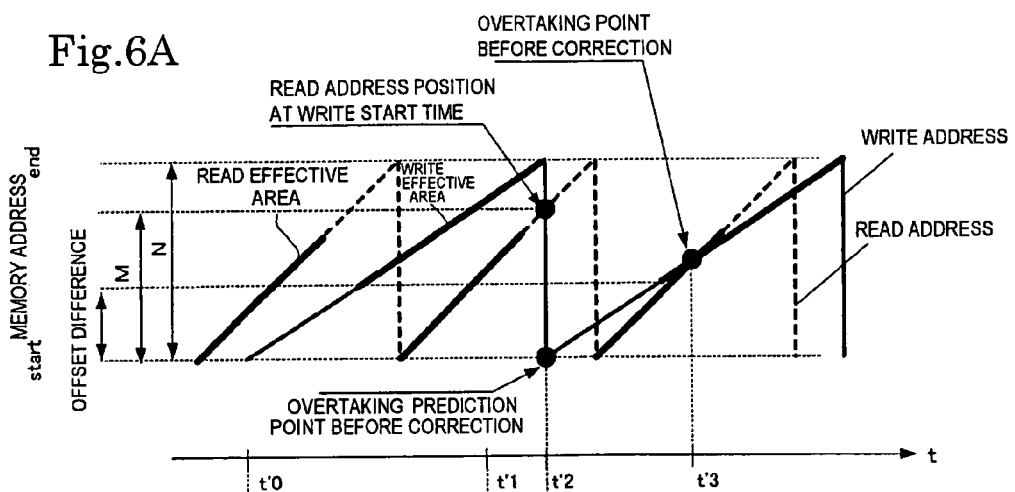
FIGS. 6A and 6B are timing charts of overtaking prediction for the case of input frame rate<output frame rate in the case of write offset address≠read offset address.
Figure 6B:
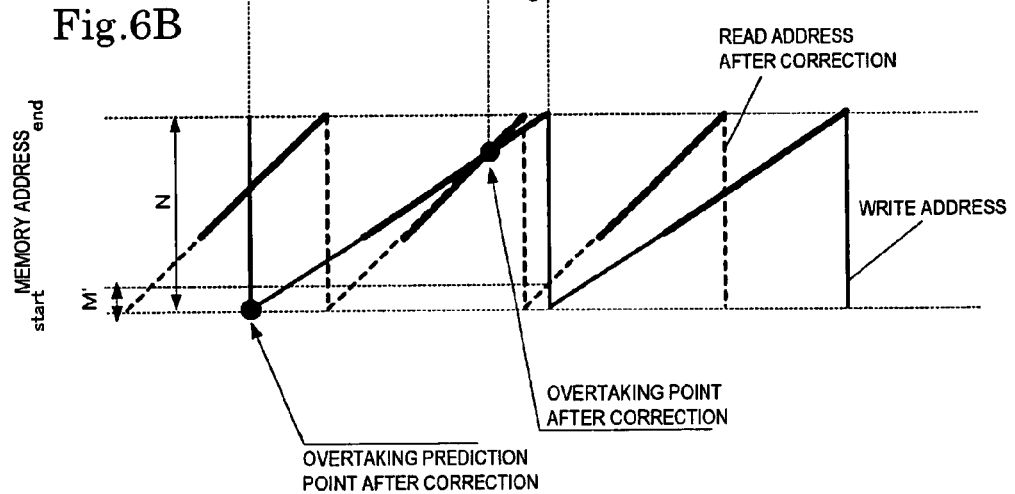

FIGS. 6A and 6B are timing charts aiding in explaining the case where the write offset address differs from the read offset address.

FIG. 6A is a timing chart showing the case where the write offset address differs from the read offset address, but this fact is not taken into account. The portions shown by thick lines in FIGS. 6A and 6B show write-side and read-side effective areas in the case of Woffset>Roffset. Similar to the description given in connection with FIG. 5, the prediction method shown in FIG. 6A predicts, at time t'2 that overtaking occurs at time t'3. However, for the write side, there is an offset difference of Woffset−Roffset and it is not correct that the read address position M referred to at time t'2 is adopted as a reference address for overtaking prediction. For this reason, in the second embodiment, the read address position M is corrected by the offset difference to find the corrected read address position M'. Namely, the time at which access to the frame memory 3 is actually performed is calculated as the origin (memory address start). This case is shown in the timing chart of FIG. 6B. (It is to be note that the read-side sawtooth wave shown by dashed lines in FIG. 6B represents a corrected imaginary output frame rate Fov, and the timing of an actual output frame rate Fov is that shown in FIG. 6A.) An expression for correcting the read address position M with this offset difference is summarized as follows:

$$\text{tmp}M = M + (W\text{offset} - R\text{offset})$$

the following conditions are completely the same as those of the correcting expression of the first embodiment:

(1) when $0 \leq \text{tempM} \leq N$,

M'=tempM (2) when tempM<0, $M' = N + \text{temp}M$ (3) when tempM>N, $M' = \text{temp}M - N$    Expression (5)

To find the above-mentioned offset difference, the CPU 10 needs only to output and set P2 (input offset) and P3 (output offset) to the overtaking control section 6.

In FIG. 6B, the point resides in the fact that the conditions of FIG. 6A are converted to the conditions that the effective areas start addresses of the write side and the read side are the same and the offset difference is 0. Accordingly, since Expression (4) can be used, at time t'0, it is possible to make an accurate overtaking prediction that overtaking occurs at time t'1, whereby it is possible to prevent erroneous detection in overtaking prediction.

Namely, if the read address position M is corrected into M' by the offset difference from Expression (5) and M' is substituted into Expression (4'), a similar expression can be obtained:

$$M' > N \times \frac{2Fiv - Fov}{Fiv} \text{ (where } Fiv > Fov/2) = K'$$

(threshold constant)

Accordingly, the processing of the overtaking control section 6 can be realized by a very simple circuit.

Third Embodiment

In the respective first and second embodiments, the overtaking prediction method for the case of Fiv (input frame rate)>Fov (output frame rate) and the overtaking prediction method for the case of Fiv (input frame rate)<Fov (output frame rate) have been separately described above. In the third embodiment, the overtaking control section 6 capable of coping with a system incapable of determining in advance which of the cases occurs will be described below with reference to FIG. 7.

A correction circuit 11 receives a read address from the output processing section 4 and performs the correction expressed by Expression (5) on the basis of input offset information (P2) and output offset information (P3) from the CPU 10, thereby generating the corrected read address M'. The corrected read address M' is transferred to a comparator 12 and a comparator 13 at the same time. The comparator 12 receives from the CPU 10 the threshold constant K (P1) for Fiv (input frame rate)>Fov (output frame rate), and performs the threshold decision comparison expressed by Expression (4).

In the meantime, at the same time, the comparator 12 receives from the CPU 10 the threshold constant K' (P1) for Fiv (input frame rate)<Fov (output frame rate), and performs the threshold decision comparison expressed by Expression (4'). The decision outputs from these comparators 12 and 13 are selectively outputted from a selector 14, and this selection decision may be controlled from the CPU 10 when the CPU 10 recognizes Fiv>Fov or Fiv<Fov. When the CPU 10 does not recognize, Fiv and Fov are inputted to the CPU 10, and may be automatically determined by a frame rate detecting function for measuring Fiv and Fov periods which is realized by an internal counter of the CPU 10. In a latch 15, the output signal from the selector 14 is latched at a fall of IVS which corresponds to an overtaking prediction point, whereby the write inhibit signal (SO) is generated.

In this manner, the overtaking prediction method of the invention can be realized by a very simple circuit and can easily cope with both cases of Fiv>Fov and Fiv<Fov. Accordingly, the overtaking prediction method of the invention has the feature of being capable of flexibly coping with systems using variable input and output frame rates.

Fourth Embodiment

In each of the above-mentioned embodiments of the invention, an overtaking prediction control method which corrects a read address with an offset difference has been described in detail with reference to an example of general single-picture display. The following description refers to an example in which the method is applied to a multi-picture display, for the purpose of explaining further usefulness and applicability of the present inventive method. Incidentally, although in the following description the number of multi-pictures is two, the number of multi-pictures is not limited to two and may also be greater than two.

The multi-picture display (dual-picture display) is a display mode in which input video data having two different frame rates are synthesized and displayed on the screen of one display device having a display rate completely asynchronous to the inputs. One example of the picture layout of the multi-picture display is a dual-picture independent display as shown in FIG. 8A, and another example is a dual picture-in-picture display in which two pictures are superimposed as shown in FIG. 8B.

In the case of the multi-picture display as well, overtaking similarly occurs when frame rate conversion is performed, as described above in connection with a single-picture display in each of the embodiments, and the overtaking prediction control of the present inventive method is also applied to the fourth embodiment.

Figure 9:
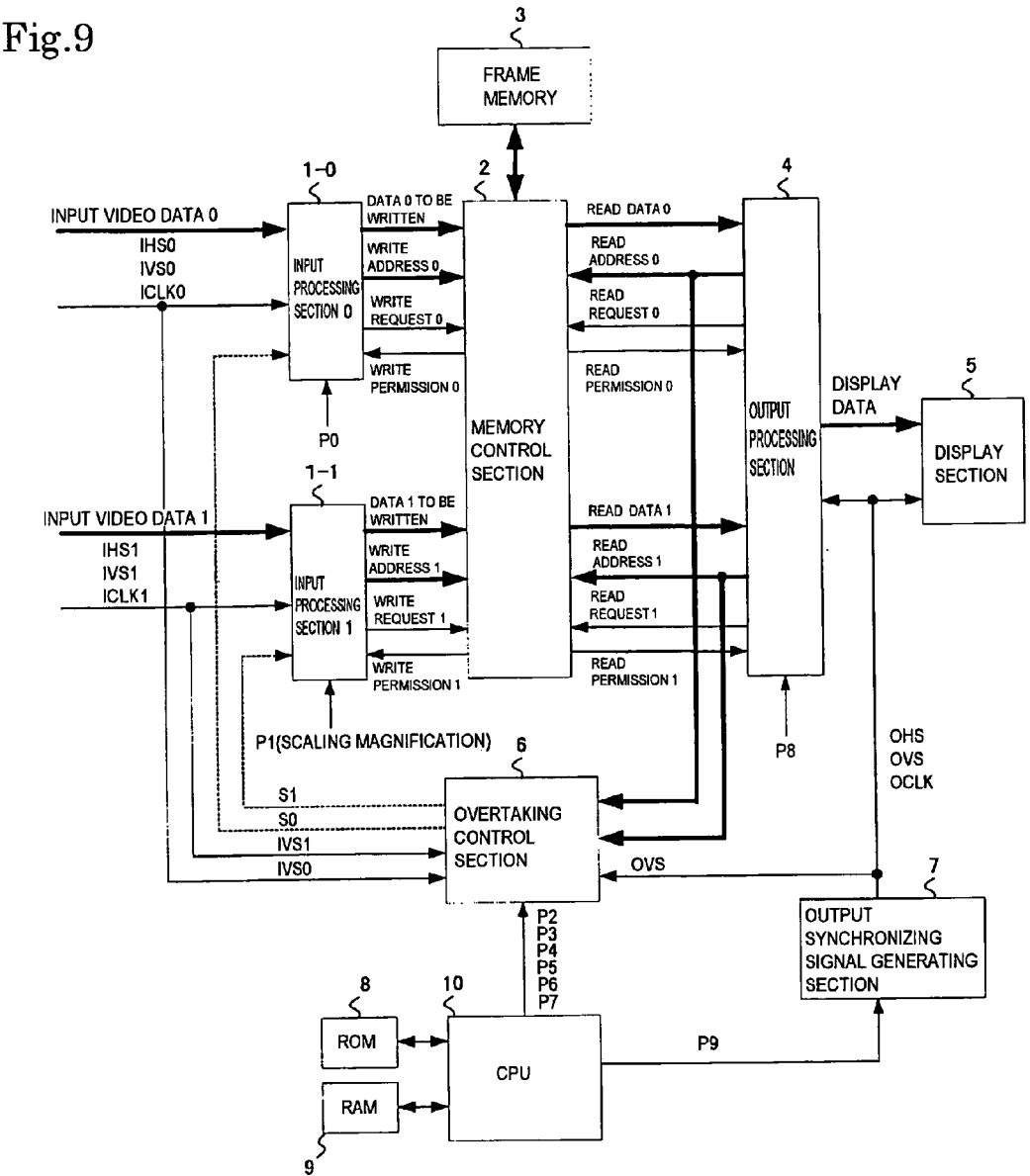
FIG. 9 is a block diagram aiding in explaining an overtaking prediction control method for multi-picture display.

FIG. 9 is a block diagram showing a display control device and a display device which perform overtaking prediction control during multi-picture display. As is apparent from FIG. 9, the construction shown in FIG. 9 is nearly the same as that shown in FIG. 1 which is a block diagram of overtaking prediction control during single-picture display. Accordingly, the difference between the construction of FIG. 9 and the construction of FIG. 1 will be described below in brief.

To cope with dual-picture display, the construction shown in FIG. 9 is provided with two input processing sections 1-0 and 1-1 having the same construction, and the CPU 10 can specify independent scaling magnifications (P0 and P1) for the respective input processing sections 1-0 and 1-1. The output processing section 4 can read from the frame memory 3 through two independent lines to synthesize pictures, and can synthesize and output two read data according to a picture layout P8 from the CPU 10.

The synthesizing method of the output processing section 4 is executed by outputting read data 0, read data 1 and background data (not shown) to the effective display area of the display section 5 while effecting switching between these data according to the picture layer P8 from the CPU 10. (The detailed description of a multi-picture synthesizing method is omitted herein, because such description departs from the gist of the invention). Owing to these added constituent elements, the memory control section 2 can perform access control of the frame memory 3 through two writing lines and two reading lines, a total of four lines, and the frame memory 3 has the role of storing two frames of video data in the form of a single buffer×two pictures in the example shown in FIG. 9. Accordingly, the overtaking control section 6 has signal lines similarly expanded by the number of pictures, and is constructed to refer to read addresses 0 and 1, perform overtaking prediction on the basis of parameters (P2-P7) such as a decision threshold value and input/output offset values from the CPU 10, and independently transfer a write inhibit signal S0 to the input processing section 1-0 and a write inhibit signal S1 to the input processing section 1-1.

Figure 10:
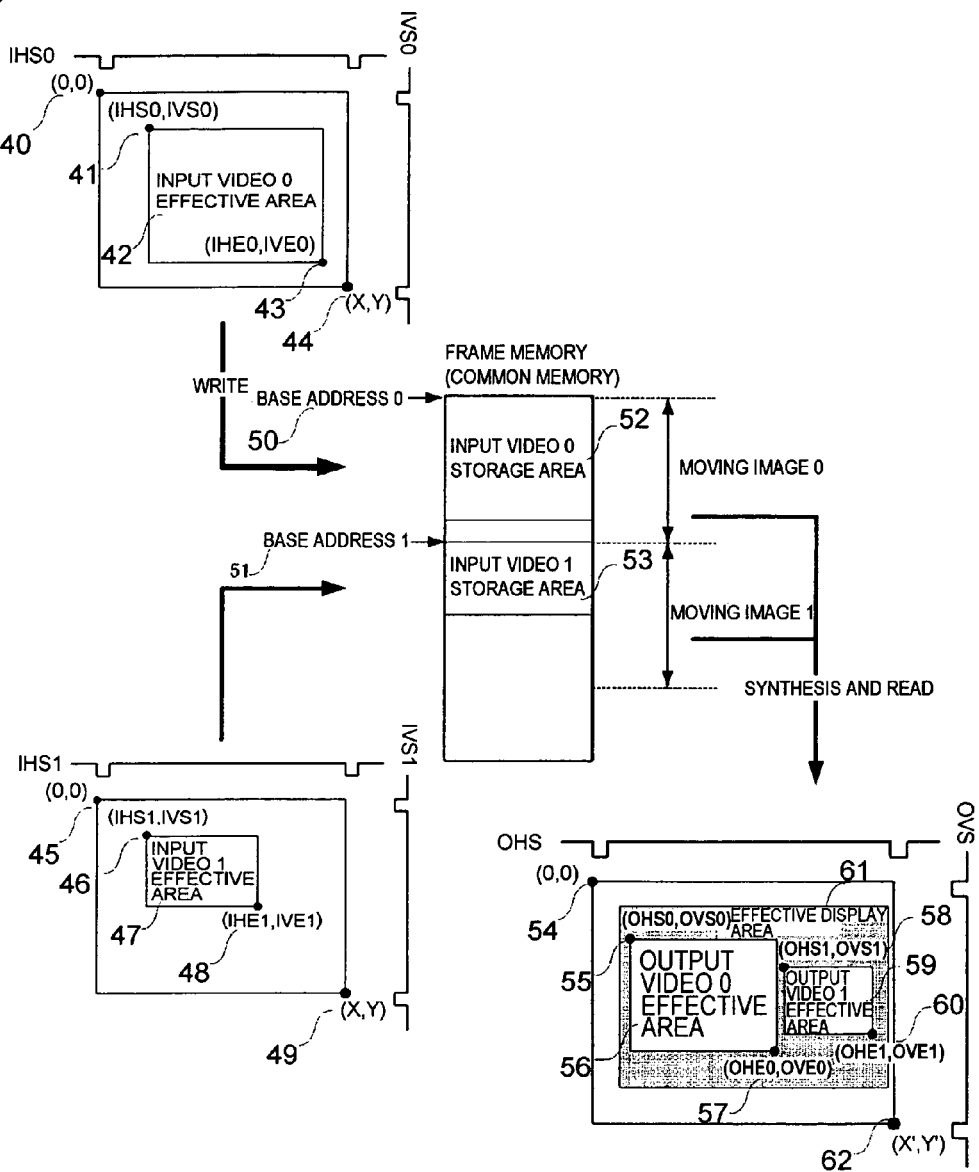
FIG. 10 is a schematic view showing the outline of writing to and reading from a frame memory in FIG.
Figure 11A:
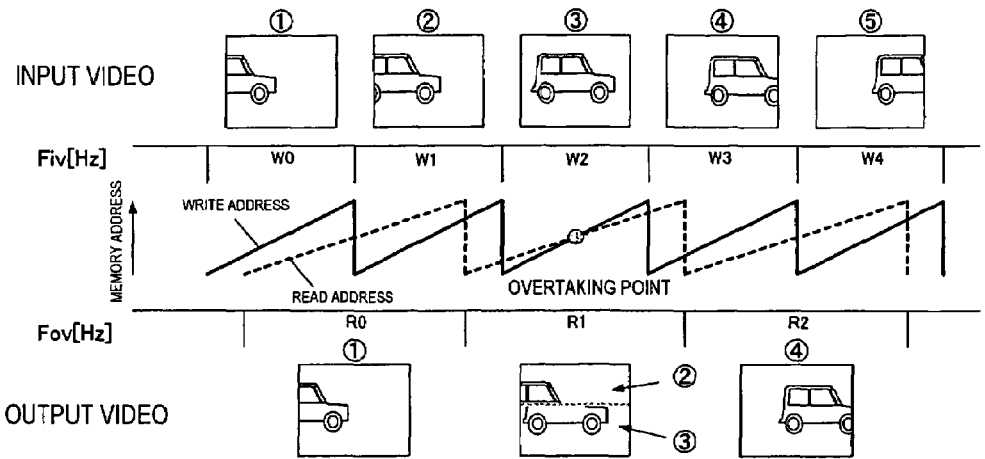
FIGS. 11A and 11B are explanatory views of overtaking in the case of input frame rate>output frame rate.
Figure 11B:
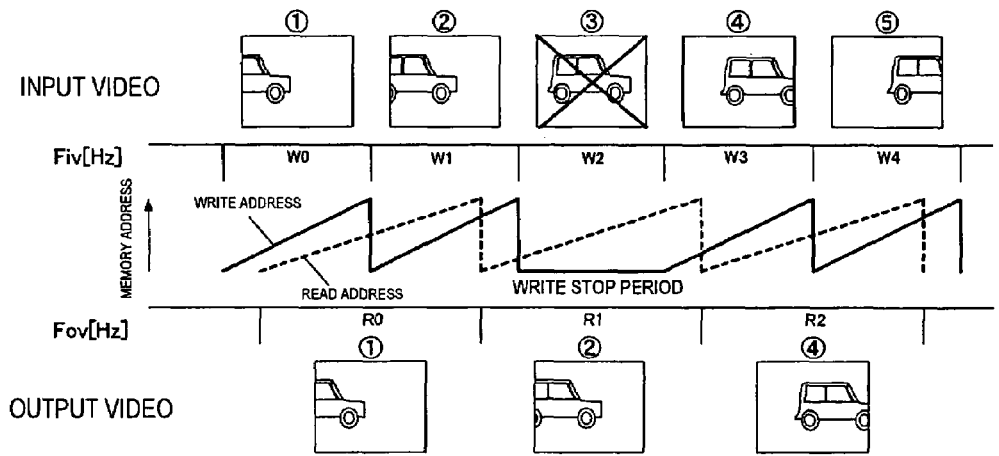
Figure 12A:
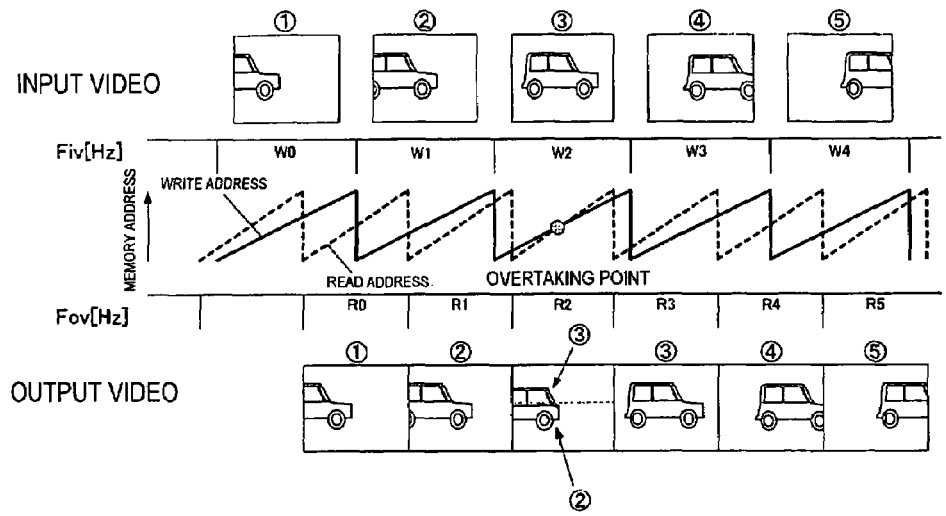
FIGS. 12A and 12B are explanatory views of overtaking in the case of input frame rate<output frame rate.
Figure 12B:
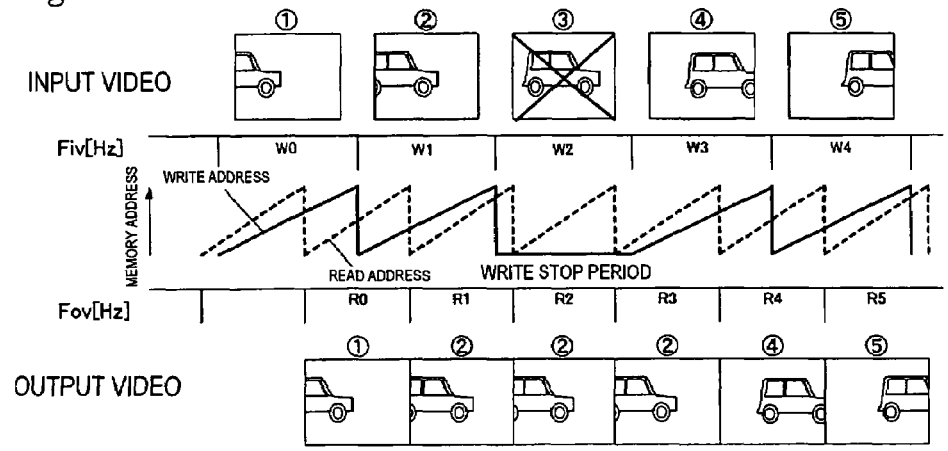

FIG. 10 shows the outline of writing to and reading from the above-mentioned frame memory 3 in the block diagram of FIG. 9. The input video data 0 include one frame of area represented as an area extending between a reset point 40 (0, 0) which corresponds to a fall of an input horizontal synchronizing signal (IHS0) and a fall of an input vertical synchronizing signal (IVS0) and the next reset point 44 (X, Y) which corresponds to the next fall of the input horizontal synchronizing signal (IHS0) and the next fall of the input vertical synchronizing signal (IVS0), and an input video 0 effective area 42 which exists in that area is defined as an area extending between a start point 41 (IHS0, IVS0) and an end point 43 (IHE0, IVE0). The input video data 1 include one frame of area represented as an area extending between a reset point 45 (0, 0) which corresponds to a fall of an input horizontal synchronizing signal (IHS1) and a fall of an input vertical synchronizing signal (IVS1) and the next reset point 49 (X, Y) which corresponds to the next fall of the input horizontal synchronizing signal (IHS1) and the next fall of the input vertical synchronizing signal (IVS1), and an input video 1 effective area 47 which exists in that area is defined as an area extending between a start point 46 (IHS1, IVS1) and an end point 48 (IHE1, IVE1) The phrase "writing to the frame memory 3" means writing the input video 0 effective area 42 to the frame memory 3 on the basis of a base address 50 indicative of the start point 41 (IHS0, IVS0) and writing the input video 1 effective area 47 to the frame memory 3 on the basis of a base address 51 indicative of the start point 46 (IHS1, IVS1), and an input video 0 storage area 52 for one frame and an input video 1 storage area 53 for one frame are allocated to a common memory as two moving image planes.

The display data include one frame of area represented as an area extending between a reset point 54 (0, 0) which corresponds to a fall of the output horizontal synchronizing signal (OHS) and a fall of the output vertical synchronizing signal (OVS) and the next reset point 62 (X', Y') which corresponds to the next fall of the output horizontal synchronizing signal (OHS) and the next fall of the output vertical synchronizing signal (OVS), and in a display effective area 61 which exists in that area, a video element having an output video 0 effective area 56 extending between a start point 55 (OHS0, OVS0) and an end point 57 (OHE0, OHE0) and a video element having an output video 1 effective area 59 extending between a start point 58 (OHS1, OVS1) and an end point 60 (OHE1, OHE1) are defined as an output synthesized picture by picture layout. The phrase "reading from the frame memory 3" means that the output processing section 4 reads the input video 0 effective area 42 and the input video 1 effective area 47 from the frame memory 3 on the basis of the base address 50 and 51 in synchronism with the timing of the above-mentioned synthesized picture layout.

From this modeling of the multi-picture display, it can be seen that the overtaking prediction method of the overtaking control section 6 can handle the moving image planes 0 and 1 in completely the same manner as the methods described as to a single picture in the above-mentioned embodiments. Specifically, as to the image moving plane 0, Expression (4) or Expression (4') may be selected according to the difference in frame rate between IVS0 and OVS, and as to the correction of the read address 0, Expression (5) may be calculated with the offset difference=Woffset−Roffset= (HIS0+IVS0)−(OHS0+OVS0).

As to the image moving plane 1, Expression (4) or Expression (4') may be selected according to the difference in frame rate between IVS1 and OVS, and as to the correction of the read address 1, Expression (5) may be calculated with the offset difference=Woffset−Roffset= (HIS1+IVS1)−(OHS1+OVS1).

Figure 7:
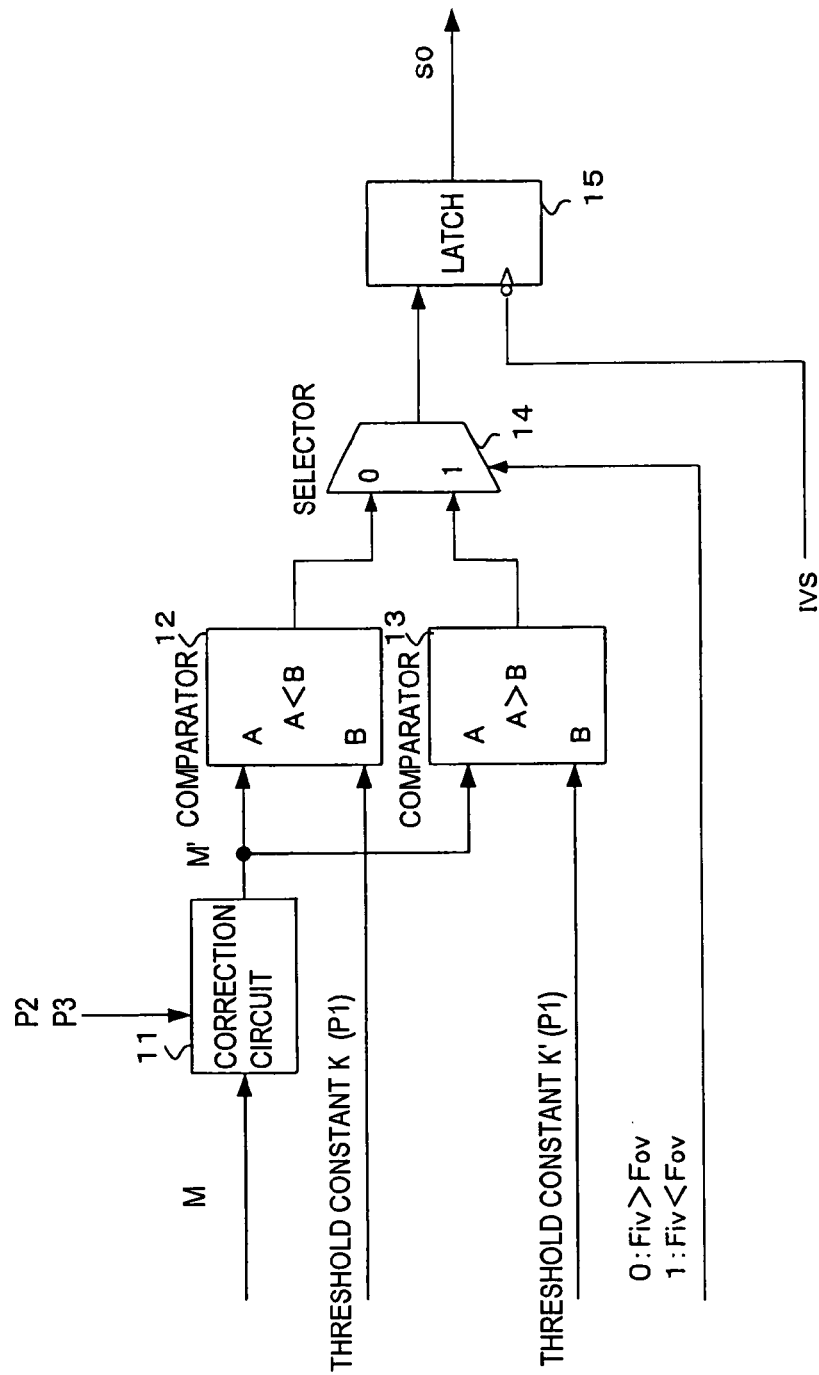
FIG. 7 is a block diagram aiding in explaining an overtaking prediction control method according to a third embodiment of the invention.

Namely, the fourth embodiment can be realized by preparing the simple circuit shown in FIG. 7 by the number of pictures (in this embodiment, two pictures), and can be very easily extended to multi-picture displays.

Unlike single-picture display, dynamically varying parameters for many applications for multi-picture display are based on the changes of picture layouts. Accordingly, each time a picture layout is changed, the CPU 10 transfers and updates input offset 0 (P4), output offset 0 (P5), input offset 1 (P6) and output offset 1 (P7) indicative of the offset difference of this changed picture layout to the overtaking control section 6. Accordingly, even if a dynamically picture layout change occurs, it is possible to realize constantly accurate overtaking prediction.

Fifth Embodiment

Each of the above embodiments has been described on the assumption that the point 24 (X, Y)=the point 31 (X', Y')=all memory addresses N to be accessed, each of the point 24 (X, Y) and the point 31 (X', Y') being the end-point coordinates of one frame in FIG. 2. FIG. 10 is also the same case. However, there is expected to be an actual case in which the point 24 (X, Y)≠the point 31 (X', Y'). In the following description of the fifth embodiment, reference is made to the fact that the present inventive method can be easily applied to such a case.

It is assumed here that Ni (=X+Y) denotes all memory addresses to be accessed as a timing format on an input side and No (X'+Y') denotes all memory addresses to be accessed as a timing format on an output side. The difference between the write-side speed and the read-side speed which are used in frame rate conversion is represented by the number of addresses accessible per unit time, and cannot be simply determined on the basis of the speed difference between input and output frame rates. Accordingly, the difference between the write-side speed and the read-side speed needs to be determined from the comparison of Ni×Fiv>No×Fov and Ni×Fiv<No×Fov. The following description refers to an overtaking prediction method based on the difference between these conditions.

<Case of Ni×Fiv (Input Access Rate)>No×Fov (Output Access Rate)>

The condition that overtaking occurs in this case can be handled with a concept similar to the first embodiment. The fifth embodiment differs from the first embodiment in that Expression (2) becomes as follows:

$$Ni \times Fiv \times T = No \times Fov \times T + M \qquad \text{Expression (2'')}$$

From Expressions (1) and (2''), $$T = \frac{M}{\{Ni \times Fiv - No \times Fov\}} < \frac{1}{Fiv} \qquad \text{Expression (3'')}$$

is derived, and the following expression is derived from Expression (3''):

$$M < \frac{Ni \times Fiv - No \times Fov}{Fiv} = K'' \qquad \text{Expression (4'')}$$

(threshold constant)

The left-hand side of Expression (4'') is a variable representative of the read address position at the overtaking prediction point, while since Ni, No, Fiv and Fov on the right-hand side of Expression (4) can be recognized as operating environment in advance by the CPU 10, the right-hand side can be expressed as a threshold constant (=K'''). In Expression (4''), K''' corresponds to the first parameter in the invention.

<Case of Ni×Fiv (Input Access Rate)<No×Fov (Output Access Rate)>

The condition that overtaking occurs in this case can be handled with a concept similar to the second embodiment. The fifth embodiment differs from the second embodiment in that Expression (2'') becomes as follows:

$$Ni \times Fiv \times T = No \times Fov \times T - (N-M) \qquad \text{Expression (2''')}$$

From Expressions (1') and (2'), $$T = \frac{N-M}{\{N \times (Fov - Fiv)\}} < \frac{1}{Fiv} \qquad \text{Expression (3''')}$$

is derived, and the following expression is derived from Expression (3'''):

$$M' < \frac{2Ni \times Fiv - No \times Fov}{Fiv} = K''' \qquad \text{Expression (4''')}$$

(threshold constant)

The left-hand side of Expression (4''') is a variable representative of the read address position at the overtaking prediction point, while since Ni, No, Fiv and Fov on the right-hand side of Expression (4) can be recognized as operating environment in advance by the CPU 10, the right-hand side can be expressed as a threshold constant (=K''').

In both cases, the read address M referred to by Expressions (4'') and (4''') needs only to be corrected into M' in accordance with Expression (5), whereby it is possible to easily apply the present inventive overtaking prediction method to even the case of the fifth embodiment having a different timing format, merely by modifying the calculation expression for the threshold from the CPU 10 without modifying the hardware construction.

In each of the above-mentioned embodiments, M which is the second parameter which takes into account the difference amount between offset addresses is defined as the difference between a write address and a read address at a certain point in time (for example, at a write start time which is reset by synchronizing signals). However, a period of time corresponding to the difference between write and read addresses (the difference between a write start time and a read start time which are reset by synchronizing signals) may be used as the second parameter which takes into account the difference amount between offset addresses. In this case, the difference between offset addresses can also be calculated in terms of a time difference. Time can be measured by counting the progress of a clock or an address which is a reference, by means of a counter or the like.

(Video Receiving Display Device)

One example of a video receiving display apparatus using a display control device including a frame conversion device according to the above-mentioned invention will be described below.

Figure 13:
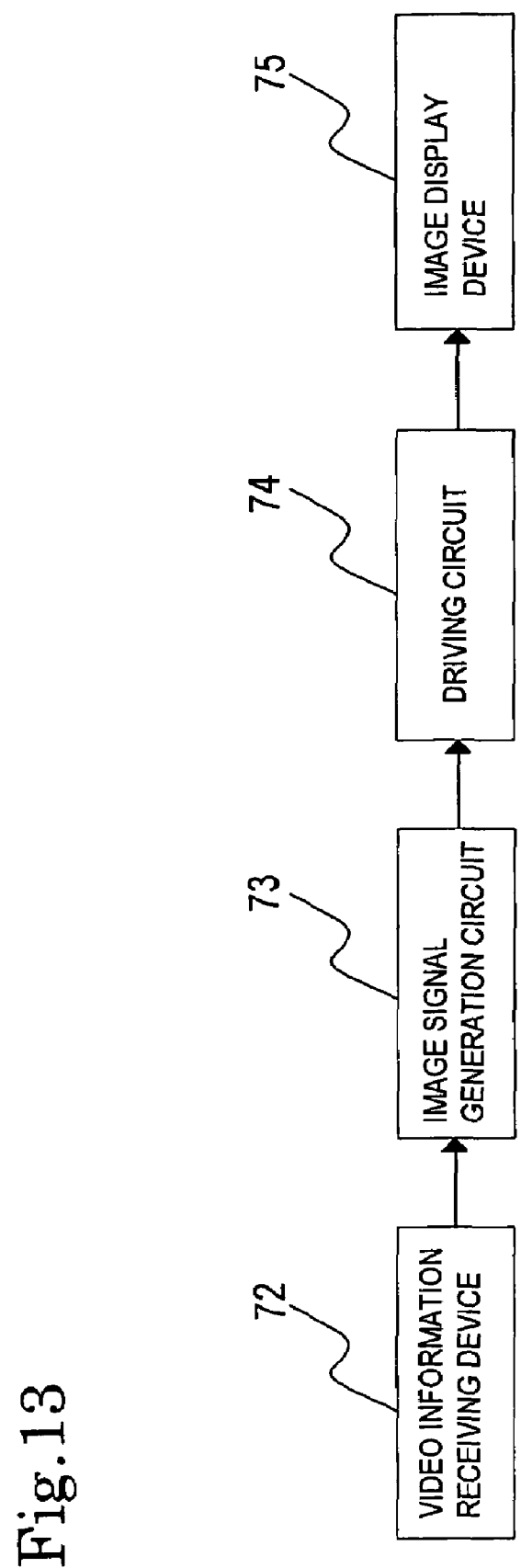
FIG. 13 is a block diagram showing one example of a video receiving display apparatus using a display control device according to the invention.

FIG. 13 is a view showing a schematic construction of a video receiving display apparatus according to the invention. The construction shown in FIG. 13 includes a video information receiving device 72, an image signal generating circuit 73 having a display control device including a frame rate conversion device according to the invention, a driving circuit 74, and a flat-panel image display device 75 having a multiplicity of fixed pixels, such as LCDs, ELDs, PDPs, SEDs and FEDs.

First of all, video information (input video data) received by the video information receiving device 72 is inputted to the image signal generating circuit 73, and the image signal generating circuit 73 generates an image signal. The video information receiving device 72 may make use of a receiver such as a tuner capable of making a selection from channels of wireless broadcasting, wired broadcasting, video broadcasting via the Internet and the like, and receiving a video signal on the selected TV channel.

In addition, by connecting audio equipment or the like to the video information receiving device 72, it is possible to construct a television set which includes, in addition to the audio equipment, the image signal generating circuit 73, the driving circuit 74, and the image display device 75 driven by the driving circuit 74.

The image signal generating circuit 73 generates an image signal (display data) corresponding to each pixel of the image display device 75 from the video information, and inputs the image signal to the driving circuit 74. The driving circuit 74 controls a voltage and a current to be applied to the image display device 75, on the basis of the input image signal, and causes the image display device 75 to display an image.

This application claims priority from Japanese Patent Application No. 2003-333870 filed Sep. 25, 2003, and Japanese Patent Application No. 2004-265364 filed Sep. 13, 2003, which are hereby incorporated by reference herein.

What is claimed is:

1. A frame rate conversion device comprising:
a memory controller which performs input and output of data to and from a common frame memory while making an input frame frequency and an output frame frequency different from each other;
an overtaking prediction unit which predicts an overtaking frame in which overtaking occurs between the input and the output of the data to and from the memory; and
a memory writing controller which brings writing to the memory to a stop when the overtaking prediction unit predicts that the overtaking occurs,
wherein the overtaking prediction unit predicts the overtaking frame on the basis of a corrected read address position M' which is obtained by correcting a read address M at a writing start time in the overtaking frame according to an offset address different amount Woffset−Roffset, where Woffset represents a write start offset address and Roffset represents a read start offset address.

2. A frame rate conversion device comprising:
a memory controller having at least two inputs and operative to perform input and output of data to and from a common frame memory while making an input frame frequency and an output frame frequency different from each other with respect to each of the inputs;
an overtaking prediction unit provided for each of the inputs to predict an overtaking frame in which overtaking occurs between the input and the output of the data to and from the memory; and
a memory writing controller provided for each of the inputs to bring writing to the memory to a stop when the overtaking prediction unit predicts that the overtaking occurs,
wherein the overtaking prediction unit predicts the overtaking frame on the basis of a corrected read address position M' which is obtained by correcting a read address M at a writing start time in the overtaking frame according to an offset address different amount Woffset−Roffset, where Woffset represents a write start offset address and Roffset represents a read start offset address.

3. A frame rate conversion device according to claim 1, wherein the overtaking prediction unit has a function of predicting the frame in which the overtaking occurs between the input and the output of the data, on the basis of a first parameter calculated by using the input frame frequency, the output frame frequency and one frame of address amount in the input and the output and a second parameter corresponding to a progress speed of a read address at an overtaking prediction point and to an offset address difference amount.

4. A frame rate conversion device according to claim 3, wherein when a progress speed of a write address for the memory is faster than the progress speed of a read address for the memory, a first parameter is derived from a result obtained by dividing by the input frame frequency a difference amount between a result obtained by multiplying one frame of address amount in the input by the input frame frequency and a result obtained by multiplying one frame of address amount in the output by the output frame frequency.

5. A frame rate conversion device according to claim 3, wherein when a progress speed of a write address for the memory is slower than the progress speed of a read address for the memory, a first parameter is derived from a result obtained by dividing by the input frame frequency a difference amount between twice as large as a result obtained by multiplying one frame of address amount in the input by the input frame frequency and a result obtained by multiplying one frame of address amount in the output by the output frame frequency.

6. A frame rate conversion device according to claim 3, wherein a second parameter is derived by performing correction to add the offset address difference amount to a read address during the writing to the memory.

7. A frame rate conversion device according to claim 6, wherein the overtaking prediction unit has a comparison unit which compares a first parameter and a second parameter, the comparison unit having a function of predicting a frame in which overtaking occurs, by effecting switching between comparison conditions according to a difference between a progress speed of a write address for the memory and a progress speed of a read address for the memory.

8. A frame rate conversion device according to claim 7, wherein the overtaking prediction unit has a function of predicting that overtaking occurs, when the progress speed of the write address for the memory is faster than the progress speed of the read address for the memory, while the comparison unit has a function of predicting that overtaking occurs, when the second parameter is smaller than the first parameter.

9. A frame rate conversion device according to claim 7, wherein the overtaking prediction unit has a function of predicting that overtaking occurs, when the progress speed of the write address for the memory is slower than the progress speed of the read address for the memory, while the comparison unit has a function of predicting that overtaking occurs, when the second parameter is larger than the first parameter.

10. An overtaking prediction method of, when input and output of data to and from a common frame memory are being performed with an input frame frequency and an output frame frequency made different from each other, predicting an overtaking frame in which overtaking occurs between the input and the output of the data to and from the memory, comprising:

a step of predicting the overtaking frame on the basis of a corrected read address position M' which is obtained by correcting a read address M at a writing start time in the overtaking frame according to an offset address different amount Woffset−Roffset, where Woffset represents a write start offset address and Roffset represents a read start offset address.

11. An overtaking prediction method of, when input and output of data to and from a common frame memory are being performed with an input frame frequency and an output frame frequency made different from each other, predicting an overtaking frame in which overtaking occurs between the input and the output of the data to and from the memory, comprising:

a step of predicting the overtaking frame on the basis of (a) a first parameter corresponding to a difference amount between a progress speed of a write address and a progress speed of a read address and (b) a second parameter corresponding (i) to a difference between a write address and a read address at an overtaking prediction point and (ii) to a corrected read address position M' which is obtained by correcting a read address M at a writing start time in the overtaking frame according to an offset address different amount Woffset−Roffset, where Woffset represents a write start offset address and Roffset represents a read start offset address.

12. A frame rate conversion device comprising:

a memory controller which performs input and output of data to and from a common frame memory while making an input frame frequency and an output frame frequency different from each other; and an overtaking prediction unit which predicts a frame in which overtaking occurs between the input and the output of the data to and from the memory, the overtaking prediction unit being constructed to execute an overtaking prediction method according to claim 10.

13. A display control device comprising:

a frame rate conversion device according to claim 12; and a display position control unit which displays the input data on a screen.

14. A display control device comprising:

a frame rate conversion device according to claim 2; and a multi-picture display position adjustment unit which adjusts a position where the plurality of input data are to be displayed on one screen in the form of synthesized multi-picture display.

15. A video receiving display device comprising:

an image signal generation circuit including a frame rate conversion device according to claim 12;

a video information receiving device which supplies video data to the image signal generation circuit;

a driving circuit to which display data are supplied from the image signal generation circuit; and an image display device driven by the driving circuit.

16. A video receiving display device according to claim 15, wherein said video information receiving device is capable of selecting a TV channel.

* * * * *

UNITED STATES PATENT AND TRADEMARK OFFICE
CERTIFICATE OF CORRECTION

PATENT NO. : 7,336,317 B2
APPLICATION NO. : 10/944179
DATED : February 26, 2008
INVENTOR(S) : Hideaki Yui et al.

It is certified that error appears in the above-identified patent and that said Letters Patent is hereby corrected as shown below:

COLUMN 2
Line 12, "low frames" should read --lower frames--.
Line 25, "low frames" should read --lower frames--.

COLUMN 3
Line 15, "and is" should read --and are--.

COLUMN 6
Line 16, "plurality" should read --plurality of--.
Line 47, "in FIG." should read --in FIG. 9;--.

COLUMN 7
Line 18, "(P0)" should read --(PO)--.

COLUMN 8
Line 48, "of area" should read --of an area--.

COLUMN 10
Line 64, "note" should read --noted--.

COLUMN 12
Line 24, "found" should read --found:--.

COLUMN 13
Line 25, "t'2" should read --t'2,--.
Line 35, "note" should read --noted--.

COLUMN 15
Line 63, "of area" should read --of an area--.

COLUMN 16
Line 7, "of area" should read --of an area--.
Line 26, "of area" should read --of an area--.

COLUMN 17
Line 9, "dynamically" should read --dynamical--.
Line 51, ")" should be deleted.

UNITED STATES PATENT AND TRADEMARK OFFICE
CERTIFICATE OF CORRECTION

PATENT NO.       : 7,336,317 B2
APPLICATION NO.  : 10/944179
DATED            : February 26, 2008
INVENTOR(S)      : Hideaki Yui et al.

It is certified that error appears in the above-identified patent and that said Letters Patent is hereby corrected as shown below:

COLUMN 19
Line 32, "2003" should read --2004--.

Signed and Sealed this

Thirtieth Day of December, 2008

JON W. DUDAS
*Director of the United States Patent and Trademark Office*